April 9, 1935.　　　H. C. WARNER　　　1,997,244
FINISHING TOOL
Filed Dec. 8, 1930　　2 Sheets-Sheet 1

INVENTOR
Homer C. Warner
BY Harvey R. Hawgood
ATTORNEY

April 9, 1935.　　　H. C. WARNER　　　1,997,244
FINISHING TOOL
Filed Dec. 8, 1930　　　2 Sheets-Sheet 2

INVENTOR
Homer C. Warner
BY
Harvey R. Hawgood
ATTORNEY

Patented Apr. 9, 1935

1,997,244

UNITED STATES PATENT OFFICE 1,997,244

FINISHING TOOL

Homer C. Warner, Cleveland, Ohio, assignor to The Lees-Bradner Company, Cleveland, Ohio, a corporation of Ohio Application December 8, 1930, Serial No. 500,691

5 Claims. (Cl. 51—123)

This invention relates to apparatus for cutting surfaces of gear teeth and the like, and is particularly adapted for use in the cutting of teeth by the generating principle.

An object of the invention is to provide an improved machine by which two surfaces may be simultaneously generated with extreme accuracy.

Another object is to provide an improved machine which will be simple in construction and operation.

Another object is to provide an improved mechanism in which comparatively few parts must be formed with extreme accuracy.

Another object is to provide an improved mechanism in which adjustments can be quickly and easily effected.

Other objects will hereinafter appear.

The invention will be better understood from the description of one practical embodiment thereof illustrated in the accompanying drawings, in which.

Figure 1:
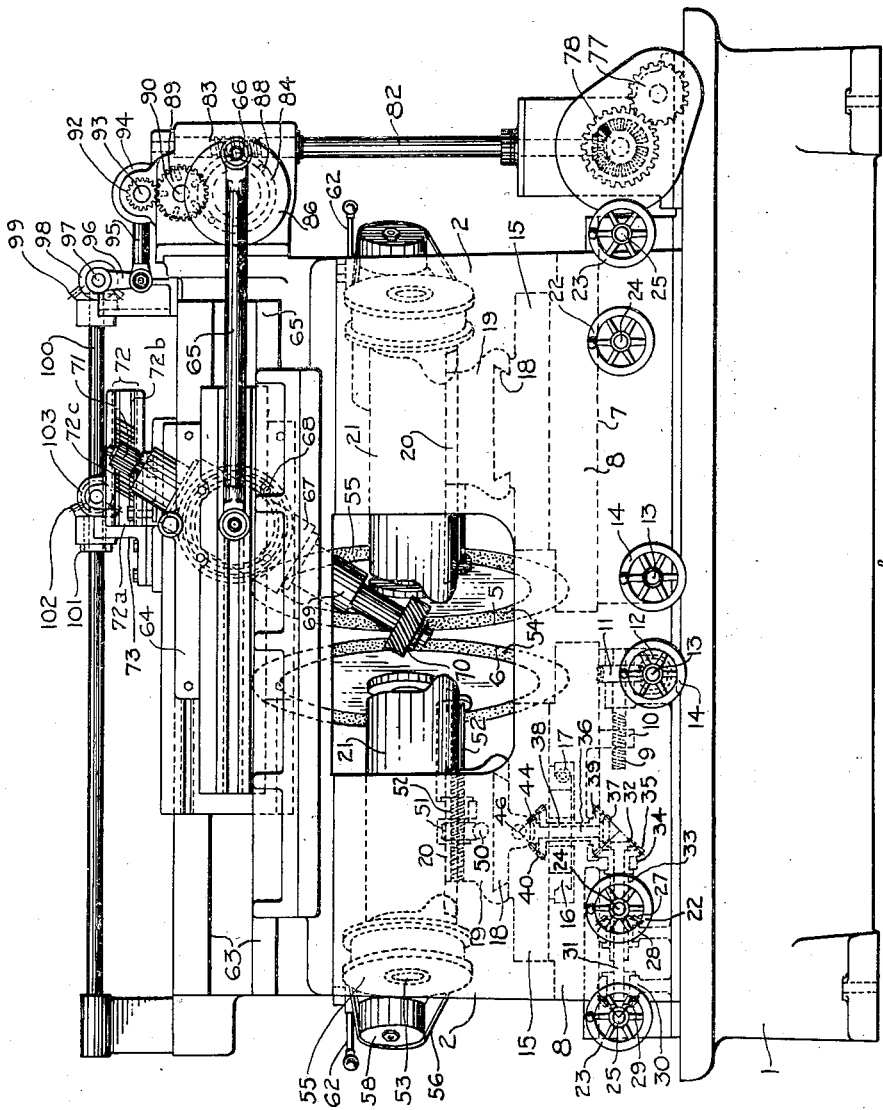
Figure 1 is a front elevation of the machine embodying the invention.
Figures 2, 3:
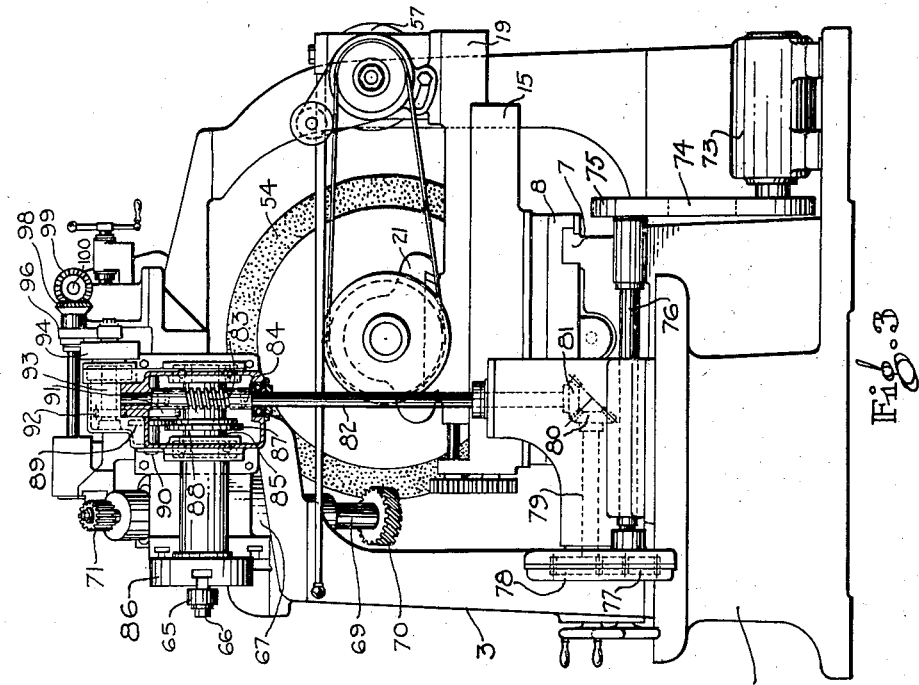
Figure 2 is an end elevation of the machine of Figure 1 taken from the left of this figure.
Figure 3 is a similar elevation taken from the right of Figure 1.

The machine comprises a bed or base 1 upon which the cutting mechanism, illustrated as a pair of grinding wheels, and the work supporting mechanism are carried. Upwardly extending supports 2 and 3 are rigidly attached to the bed and carry a horizontal or top supporting member 4 on which the work holding apparatus is positioned.

The vertical and horizontal supports 2, 3 and 4 enclose a central space within which the cutting members, illustrated as a pair of grinding wheels 5 and 6, are positioned. Horizontal ways 7 are formed on the upper surface of the bed within the central open space, these ways extending longitudinally along said space, and upon these are mounted two tables or carriages 8 which may be adjusted along said ways by screws 9 threaded through depending bosses 10 on the carriages, each screw being provided with a worm wheel 11 with which meshes a worm 12 mounted on a horizontal shaft 13 and provided at its outer end with a handwheel 14.

Pivoted upon each table 8 to be adjustable about a vertical axis is a circular support 15. Formed integrally with the support is a depending flange 16 provided on its outer periphery with worm wheel teeth which mesh with a worm formed on a shaft 17 having a squared end to receive a wrench, crank or handle by which the angular position of the support may be adjusted.

Guides or ways 18 are formed upon the upper surface of the circular support and a slide 19 adjustably carried thereby. The slide 19 is provided on its upper surface with guides or ways 20 extending in a direction perpendicular to the guides 18 and mounted on the last mentioned ways in a tool spindle supporting member 21.

Means for operating the tool spindle support consist of two handwheels 22 and 23 mounted on horizontal shafts 24 and 25 respectively. The inner ends of these shafts are provided with bevelled pinions 26, that on shaft 24 meshing with a bevelled pinion 27 supported in a bearing 28 carried by the base, and that on shaft 25 meshing with the bevelled pinion 29 similarly supported in bearing 30. The pinion 29 is splined to a horizontal shaft 31 which carries on its inner end a bevelled pinion 32. A sleeve 33 surrounds shaft 31 and to the sleeve is splined pinion 27, the sleeve being supported in bearing 34, and assisting in supporting the shaft 31, the sleeve terminating in a bevelled pinion 35.

A central vertical shaft 36 terminates in a bevelled pinion 37 meshing with pinion 32 and is surrounded with a sleeve 38 having at its lower end a bevelled pinion 39 meshing with pinion 35, the shaft being journalled in the sleeve and the sleeve, in turn, being journalled in the carriage 8. The upper end of sleeve 38 is provided with a bevelled pinion 40 which meshes with the gear 41 fixed to a screw 42, the screw being threaded through a depending boss 43 on the slide 19, so that, irrespective of the position of the table, rotation of handwheel 22 will cause the slide to be translated along ways 18.

A bevelled pinion 44 is secured to the upper end of shaft 36 and meshes with a bevelled pinion 45 on a horizontal shaft 46 journalled in the circular table 15. The end of this shaft is provided with a gear 47 meshing with a gear 48 secured to a shaft 49 to which is splined a worm 50 driving a worm wheel 51 having a thread in its interior, by which it may be caused to traverse a screw 52 secured to the spindle support 21, and so traverse this support along guides 20.

A spindle 53 is journalled in the support 21 and is provided on its inner end with a grinding wheel having a flat outwardly directed grinding face 54, with which the cutting of the gear teeth is effected. The opposite end of the spindle is provided with a pulley 55 driven by a belt 56 by power from a motor 57, the motor driving a pulley 58 carried by slide 19. Adjustment of the belt is provided by idler on 59 on an arm 60 pivoted on the axis of the motor shaft. A clutch 61 having an operating handle 62 releases the pulley 58 from the motor, or engages it with the power shaft, as may be required in the operation of the machine.

The work carrying portion of the mechanism comprises guides 63 formed in the support 4 on which is mounted a slide 64 which may be reciprocated by means of a connecting rod 65 operated by a crank 66 driven by mechanism to be hereinafter described.

Trunnioned on the slide is a work spindle support 67 which is clamped into position as by bolts 68 and in which is journalled a work spindle 69 to the lower end of which a work gear 70 may may be secured.

The upper end of the work spindle has connected to it a spur pinion 71, which meshes with the oblique teeth of a rack 72 adjustably carried in a holder 73 which may be adjustably secured upon the upper surface of support 4.

This rack is formed of three parts, the central one of which, 72a, is rigidly connected to the carrier, while the lower one of which, 72b, is slidable and urged slightly out of alinement with the stationary portion by a spring, for the purpose of preventing any looseness or backlash between the pinion 71 and the teeth of the stationary portion. The upper portion, 72c, of rack extends beyond the stationary and lower portions, and may be moved a distance equal to that between adjacent teeth for indexing the work spindle. The means for operating this indexing portion of the rack will be later described.

The means for operating the work carrying mechanism consists of a motor 73 mounted on the base 1 and driving, through a belt 74, a pulley 75 and the end of a transverse shaft 76 journalled on the base, the opposite end of which shaft is provided with a gear 77 driving a gear 78 secured to another transverse horizontal shaft 79. The gears 77 and 78 may be changed to vary the speeds at which the parts are driven.

The shaft 79 is provided at its inner end with a bevelled pinion 80 meshing with a bevelled pinion 81 on a vertical shaft 82 which, adjacent its upper end, is provided with a worm 83 driving a worm wheel 84 attached to a horizontal shaft 85 having at its outer end a slotted crank disc 86 in the slot of which the crank 66 is adjustably mounted.

The shaft 85 is also provided with a disc 87 having a pin 88 constituting one element of a Geneva movement, the other element of which is a notched disc 89 mounted on a shaft 90 provided with a gear 91 driving a gear 92 upon a shaft 93 with an intermittent motion.

The shaft 93 carries a crank disc 94 operating a connecting rod 95 which oscillates an arm 96 attached to shaft 97 provided at one end with a bevelled pinion 98. This pinion drives a bevelled pinion 99 attached to a shaft 100. Splined upon shaft 100 is a sleeve 101 journalled in the rack carrier 73 so that it may be oscillated at any position by the drive above described. This sleeve is provided on one end with a bevelled pinion 102 meshing with a bevelled pinion 103 fixed to a transverse shaft 104 also journalled on carrier 73. Splined upon shaft 104 is a pinion 105 which meshes with a rack 106 cut in the upper edge of part 72c, (the indexing rack) so that the indexing rack is reciprocated back and forth by the action of the Geneva movement. This reciprocation, of course, takes place when the work gear has rolled beyond the grinding wheels and turns the same one or more teeth, allowing the master gear to roll back onto the fixed portion 72a of the rack before the teeth contact the grinding wheels.

By using a rack having inclined teeth parallel to the axis of the work spindle, it is possible to use a spur pinion at 71. While it would be possible to use a pinion with helical teeth and a rack with vertical teeth, this cannot be done until the machine has been used to generate the required master gear, as no prior type of machine is capable of accurately generating tooth surfaces of helical gear. However, the spur gear above described may be accurately made upon types of machines already known, and with a rack having inclined teeth, it is possible to obtain an accurate rolling motion of the work spindle, and so hereafter will be possible to produce accurate helical master gears.

While I have described the illustrated embodiment of my invention in some particularity, obviously many others will readily occur to those skilled in this art, and I, therefore, do not limit myself to the precise details shown and described herein, but claim as my invention all embodiments, variations and modifications coming within the scope of the appended claims.

I claim:

1. A cutter supporting head for use on stationary ways or the like consisting of a table slidable along said ways, a carriage supported by said table and angularly adjustable about an axis normal to said ways, a slide carried by said carriage and longitudinally movable therealong, a spindle support mounted for longitudinal movement on said slide in a direction normal to the movement of the slide upon the carriage, concentric shafts passing from the table to the carriage through the axis about which the latter rotates, operating connections associated with said shafts, and means for controlling the movements of the slide and spindle support operated by said shafts.

2. A machine comprising a bed provided with guideways, a table slidable on said ways, a carriage supported by said table and pivoted about an axis perpendicular to said ways, a tool spindle supported by said carriage and movable in a plane normal to the axis of the carriage in two directions, two concentric shafts concentric with the axis of the carriage and extending through the same and through the table, means operated by one of said shafts controlling the movement of the spindle in one direction, means operated by the other of said shafts controlling the movement of the spindle in the other direction, and means for rotating said shafts carried by the bed.

3. A machine comprising a bed, guideways thereon, a table slidable along said ways and having a carriage pivotally mounted thereon, a tool spindle supported by said carriage and movable in a plane normal to the axis about which the carriage pivots in two mutually perpendicular directions, operating means for moving said spindle including two telescopically arranged shafts concentric with said axis and having operating means carried by the bed, and driving connections for moving said spindle.

4. A machine having a bed provided with guideways, a horizontal table movable thereon, a carriage mounted on said table and rotatable about a vertical axis, a slide upon said table movable horizontally in a direction perpendicular to the last mentioned direction, means for moving said slide and spindle holder comprising telescopically arranged shafts concentric with said axis, gears on the ends of said shafts, two horizontally arranged concentric shafts having gears engaging said gears, and handles carried by the frame for rotating said last mentioned shafts.

5. A machine having a bed provided with guideways, a horizontal table movable thereon, a carriage mounted on said table and rotatable about an axis, a slide upon said table movable horizontally in one direction, a tool spindle holder upon said slide and movable horizontally in a direction perpendicular to the last mentioned direction, means for moving said slide and spindle holder comprising telescopically arranged shafts concentric with said axis, gears on the ends of said shafts, two horizontally arranged concentric shafts having gears engaging said gears, handles carried by the frame for rotating said last mentioned shafts, a horizontal slide, a work spindle journalled therein, and means for rotating said work spindle.

HOMER C. WARNER.